Patented Aug. 10, 1943

2,326,599

UNITED STATES PATENT OFFICE 2,326,599

PROCESS FOR BREAKING PETROLEUM EMULSIONS

Gwynne Allen, Long Beach, Calif., assignor to Petrolite Corporation, Ltd., St. Louis, Mo., a corporation of Delaware No Drawing. Application May 27, 1942, Serial No. 444,761

7 Claims. (Cl. 252—340)

This invention relates primarily to the treatment of emulsions of mineral oil and water, such as petroleum emulsions, for the purpose of separating the oil from the water.

This invention is a continuation in part of my copending application, Serial No. 392,099, filed on May 6, 1941. Reference is also made to my copending applications Serial Nos. 444,762, 444,763, 444,764, 444,765, 444,766, and 444,767, filed May 27, 1942.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion, my process being particularly adapted to the resolution of crude oil emulsions of the kind obtained in connection with the treatment or the flooding of subterranean oil-bearing strata by means of aqueous agents or the like.

Another object of my invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned are of significant value in removing impurities, particularly inorganic salts, from pipeline oil.

The process which constitutes one feature of my present invention consists in subjecting a petroleum emulsion of the water-in-oil type to the action of a demulsifying agent, thereby causing the emulsion to break and separate into its component parts of oil and water or brine when the emulsion is permitted to remain in a quiescent state, after treatment, or is subjected to other equivalent separatory procedure.

The demulsifying agent employed in my process consists of a polymeric sub-rubbery sulfur-converted ester of a polyhydric alcohol, and, more particularly, an ester in which there are present at least 2 acyl radicals derived from unsaturated high molal monocarboxylic detergent-forming acids having at least 8, and not more than 32, carbon atoms each.

It is known that when elemental sulfur is heated with a reactive detergent-forming carboxylic acid, for example with oleic acid, the sulfur adds at the double bond in the oleic acid chain or radical. Where the oleic acid is employed in combination with a polyhydric alcohol, such as glycerol, as for example in triolein which is the triglyceride of oleic acid, the reaction apparently does not stop with the formation of a simple addition product. Instead, as discussed in the literature, e. g., Knight and Stamberger, J. Chem. Soc. London, 1928, pp. 2791-8, triolein takes up additional sulfur atoms, possibly even tied in through the glyceryl radical. Also, it is probable that the several fatty acid radicals present are also linked through sulfur atoms. Compare comparable reactions involving more reactive sulfur dichloride, and particularly the formation of cyclic bisulfides. Such reactions indicate the rationale for thioglycerol formation, or more exactly the formation of sulfurized esters of thioglycerol. See "Chemistry of Synthetic Resins," Ellis, 1935, volume 2, 1176-77. At any rate, in the course of the reaction polymers begin to be formed, and a certain degree of elasticity becomes apparent. Molecular weight determinations show the presence of polymers, including diads and triads (dimers, trimers), etc. Destruction of the polymeric body, for example by saponification with alkali, results in a reduction of the molecular weight, loss of the elastic properties, and apparently a return to a simpler addition product. In my process, I make no claim to the use of the simple unpolymerized addition product of sulfur and an unsaturated high molal monocarboxylic detergent-forming acid having at least 8, and not more than 32, carbon atoms, typified by sulfurized oleic acid. I make no claim to the use of the free detergent-forming carboxylic acid and sulfur alone in preparing my reagent; but I employ the acid only in combination with a polyhydric alcohol compound containing two or more alcoholiform hydroxyl groups, in the form of an ester of such acid and such polyhydric alcohol.

The compound containing the two or more alcoholiform hydroxyl groups may be a simple polyhydric alcohol, such for example as glycerol or ethylene glycol, or it may be a condensed polyhydric alcohol like polyglycerol, diethylene glycol, di-glycerol, or tri-glycerol. In addition to the above polyhydric alcohols, I may also use mannitan, sorbitan, pentaerythritol, and dipentaerythritol. I may use ether alcohols so long as they have two or more hydroxyl groups in the molecule, i. e., (polyhydric alcohols in which a carbon atom chain is interrupted at least once by oxygen, as exemplified by diethylene glycol previously mentioned). They are all characterized by containing two or more alcoholiform hydroxyl groups and by having the power to form esters with an unsaturated high molal monocarboxylic detergent-forming acid having at least 8, and not more than 32, carbon atoms.

Resinous and similar materials are sometimes classified as "thermoplastic," "thermo-setting," and "element-convertible." The expression "element-convertible" refers particularly to plastic coatings or drying oils in which hardening apparently is due to conversion into a new compound or composition by action of an element used, often oxygen. Thus, drying oils are often referred to as being "oxygen-convertible." For practical purposes, the only other element finding wide application for this purpose is sulfur. Hence, certain products, and particularly certain oils, are referred to as "sulfur-convertible," meaning that they react with sulfur or sulfur di-chloride to get polymeric materials, rubbery masses, factice, or the like.

The unsaturated high molal detergent-forming monocarboxylic acids employed by me in preparing my reagent are characterized by having a carbon atom chain, which I shall denote as "R," containing at least 8 carbon atoms, and not more than 32 carbon atoms, and which must contain at least one unsaturated bond, i. e., at least one ethylene linkage. Such acids are sometimes referred to as "ethylenic."

The acyl radical may, of course, have present other non-functional groups, such as hydroxyl groups, acyl-oxy groups, etc. It is only necessary that the presence of such groups does not detract from (a) the detergent-forming ability of the acids, and (b) their susceptibility to sulfur conversion. Suitability of substituted acids is indicated by very simple tests. For instance, saponification with caustic potash, caustic soda, or the like, must yield a soap or soap-like material. Secondly, if the detergent-forming properties have not been eliminated by the presence of this substituent atom or radical, then it is only necessary to determine that susceptibility to sulfur conversion is still present. Such test is obviously the same procedure as is herein described for preparing my reagent, except that it is conducted on a small scale in the laboratory. If the substituted acid or ester, which has been previously determined to have detergent-forming properties, also shows sulfur conversion susceptibility, it is, of course, the obvious functional equivalent of the unsubstituted or unmodified acids or esters herein described, and may be used with equal or even greater effectiveness.

Such high molal acids may be obtained from various sources, such as oils, fats, and waxes; or one may use petroleum acids, rosin acids, and the like. Petroleum acids include naturally-occurring naphthenic acids and also acids obtained by the oxidation of hydrocarbons and waxes. Rosin acids include abietic acid, pyroabietic acids, and the like. Saturated acids, such as saturated fatty acids, saturated naphthenic acids, saturated oxidized petroleum acids, etc., can frequently be converted into an unsaturated acid by halogenization, followed by a reaction of the kind exemplified by the internal Wurtz reaction.

My preference is to use unsaturated fatty acids, due to their low cost and ready availability. One need not use a single fatty acid, but may use the mixture obtained by saponification of a naturally-occurring oil or fat. For instance, special reference is made to the fatty acids, which occur naturally in olive oil, castor oil, peanut oil, cottonseed oil, fish oils, corn oil, soybean oil, linseed oil, sesame oil, lard oil, oleo oil, perilla oil, and many other naturally-occurring oils. Rapeseed oil, for example, contains appreciable proportions of tri-erucin, the tri-glyceride of erucic acid. I have found it useful to prepare my reagent.

As has been previously pointed out, the high molal acids are used in the form of the polyhydric alcohol ester having at least 2 such high molal acid radicals present. Since it is my preference to use the naturally-occurring fatty acids, it obviously follows that my preference is to use the naturally-occurring glycerides. However, if desired, one can obtain the high molal acids from any source and esterify such acids with various polyhydric alcohols, such as the glycols, in the conventional manner, to produce suitable esters which may or may not have a free or unreacted alcoholiform hydroxyl group present. The fatty acid di-glycerides typify these esters which contain a free or unreacted alcoholiform hydroxyl group (in the residue of the polyhydric alcohol, glycerol). The fatty acid tri-glycerides do not possess this free alcoholiform hydroxyl. Both types of glyceride, for example, are suitable for my purpose, provided the fatty acid present satisfies the above-expressed requirements. The manufacture of such esters is so well known that no description is required in the present instance.

One may select esters of the mixed type and such mixed esters may even contain acyl radicals which either are not high molal in character or are not unsaturated, i. e., ethylenic in nature. For instance, diolein may be reacted with one mol of acetic acid or one mol of stearic acid to give an ester which would be satisfactory for the present purpose. As an example of a modified ester which may serve, reference is made to tri-acetylated triricinolein.

I have found that, in addition to naturally-occurring fatty acids, addition and substitution products of fatty acids obtained by the action of chemical reagents on fatty acids, which latter modified fatty acids bear a simple genetic relationship to the parent fatty acids from which they were derived, are also useful for making my reagents,—so long as they are in part unsaturated, i. e., possess some double bond as shown by possession of an iodine number of appreciable magnitude. However, I make no claim to blown fatty acids or blown fatty oils for use in preparing my reagent. Stated another way, as far as the preparation of my reagent is concerned, I make no claim to sulfur-converted blown fatty acids or blown fatty oils obtained by the agency of sulfur or sulfur-dichloride.

Instead of employing natural poly-esters of reactive detergent-forming carboxylic acids in preparing my reagent, I may use synthetic esters obtained by esterifying a reactive detergent-forming carboxylic acid with a polyhydric alcohol of the kind heretofore recited and described in a conventional esterification reaction, such as reacting the alcohol with the acid or acids in various molecular proportions in the presence of, for example, dry hydrogen chloride.

The compound produced by the interaction of a polyhydric alcohol of the above kind and a reactive detergent-forming carboxylic acid of the above kind will be termed a "poly ester" in the present description. In all instances, it must contain two or more radicals or residues derived from reactive detergent-forming carboxylic acids, which may be the same or different acids; and it contains one or more radicals or residues derived from polyhydric alcohols. Diglycerides of unsaturated fatty acids are examples of poly esters, just as are the naturally-occurring tri-glycerides of unsaturated fatty acids.

The reaction of elemental sulfur with such a poly ester is at first one of simple addition of sulfur at the double bond in the chain "R" of an acid residue in such poly ester to form a sulfurized derivative which does not differ greatly from the parent ester in properties. However, when the reaction is allowed to proceed at controlled temperatures, there is obtained a complex polymeric sulfurized product of high molecular weight, which is semi-elastic and highly viscous, and which approaches the consistency of rubber, depending on the time and temperature of reaction and the proportions of reactants employed.

The nature of the chemical changes which take place is, to the best of my knowledge, not yet fully understood. I have referred above to a literature reference which suggests various mechanisms for the polymerization process. Without attempting to express exactly the composition of the reagents I employ, I desire to use those polymeric sulfurized bodies, obtained as above recited, which have a consistency short of rubber. Accordingly, I have termed them "sub-rubbery" to denote a range of polymerization between the simple sulfur addition products, on one hand, and the non-usable rubbers produced on super-polymerization, on the other. Such sub-rubbery products are capable of dissolving in solvents, such as benzol, etc., to produce fluid reagents which are practicable to be used commercially.

In preparing my preferred reagent, 125 parts by weight of castor oil are heated to 130° C. Fifteen parts by weight of sulfur are added, and the mixture is stirred continuously for 45–60 minutes at 188–190° C., or until a sample withdrawn from the reaction vessel and cooled is semi-elastic and transparent, indicating complete absence of unreacted sulfur.

As a second example of a reagent which I prefer to use, 298 parts of ricinoleic acid are mixed with 46 parts of glycerol and the mixture is agitated and heated in the presence of dry hydrogen chloride gas at a temperature in excess of 100° C. for a period of time sufficient to produce an ester. (I have found that reacting 6 hours at 150° C. is satisfactory to accomplish this.) If this procedure is tedious or undesirable, the di-glyceride of ricinoleic acid may be prepared in any other desired manner. For example, di-glycerides are commonly prepared by treating two mols of the tri-glyceride with one mol of glycerol, in the presence of an alkaline catalyst. The ester so produced is mixed with 15% of its weight of elemental sulfur, and the agitation and heating are continued until all the sulfur is assimilated and a clear transparent product is obtained, as shown by a test on glass. The product has considerable viscosity and a semi-elastic nature.

Other esters of unsaturated fatty acids or other reactive detergent-forming carboxylic acids, of the kind heretofore mentioned, may be used instead of the castor oil and the ricinoleic acid of the above examples. For example, I have used cottonseed oil instead of castor oil in making certain examples of my reagent, and have found it to be useful therein. However, when cottonseed oil is used, the reaction is usually not as smooth as when castor oil is employed. Also, it is usually found that longer heating is required to produce the desired reagent of optimum properties. It is, therefore, preferable to use castor oil rather than cottonseed oil, so far as I am aware.

The stages of polymerization and the elastic properties of the resulting products may be altered by varying the temperature of the reaction, the time of the reaction, or the proportions of reactants employed, or any combination of these variables. I have found that the most effective reagents are those obtained by reacting 100 parts by weight of the ester with from 10 to 17 parts by weight of sulfur, controlling the temperature to avoid the evolution of hydrogen sulfide so far as is practicable, and employing a time sufficient to obtain highly polymerized products which, however, are still soluble in petroleum distillates.

The complex polymeric sub-rubbery sulfurized compound obtained as recited above may be diluted with one or more solvents or diluents to improve its viscosity or other characteristics as desired. Examples of suitable diluents are isopropanol, mineral spirits, benzol, etc.

In practising my process, the improved treating agent hereinbefore described is usually employed in the proportion of one part of reagent to from 2,000 to 20,000 parts of petroleum emulsion, either in concentrated form or after diluting as desired with a suitable vehicle or diluent or solvent. I desire to point out that the superiority of my reagent or demulsifying agent is based on its ability to treat or break certain emulsions more advantageously, and at a lower cost than is possible with other available demulsifiers or conventional mixtures thereof.

In practising my process, a reagent of the kind above described is brought into contact with or is caused to act upon the emulsion to be treated in any of the various ways or by any of the various apparatus now generally used to resolve or break petroleum emulsions with a chemical reagent, the above procedure being used either alone or in combination with some other demulsifying procedure, such as the electrical dehydration process.

While I have described in detail the preferred embodiment of my invention, it is understood that the materials employed, the proportions of ingredients, the arrangement of steps and the details of procedure may be variously modified without departing from the spirit of the subjoined claims.

I claim:

1. A process for breaking petroleum emulsions of the water-in-oil type, characterized by subjecting the emulsion to the action of a demulsifier comprising a sub-rubbery polymeric sulfur-converted polyhydric alcohol ester; said ester prior to sulfur-conversion containing at least 2 unsaturated high molal detergent-forming mono-carboxylic acid radicals having at least 8 carbon atoms and not more than 32 carbon atoms each.

2. A process for breaking petroleum emulsions of the water-in-oil type, characterized by subjecting the emulsion to the action of a demulsifier comprising a sub-rubbery polymeric sulfur-converted polyhydric alcohol ester; said ester prior to sulfur conversion containing at least 2 unsaturated high molal detergent-forming mono-carboxylic acid radicals having at least 8 carbon atoms and not more than 32 carbon atoms each; and said ester prior to sulfur-conversion being free from any unreacted hydroxyl radical as part of the alcoholic residue.

3. A process for breaking petroleum emulsions of the water-in-oil type, characterized by subjecting the emulsion to the action of a demulsifier comprising a sub-rubbery polymeric sulfur-converted polyhydric alcohol ester; said ester prior to sulfur-conversion containing at least 2 unsaturated fatty acid radicals having at least 8 carbon atoms and not more than 32 carbon atoms each; and said ester prior to sulfur-conversion being free from any unreacted hydroxyl radical as part of the alcoholic residue.

4. A process for breaking petroleum emulsions of the water-in-oil type, characterized by subjecting the emulsion to the action of a demulsifier comprising a sub-rubbery polymeric sulfur-converted polyhydric alcohol ester; said ester prior to sulfur conversion containing at least 2 monoethylenic fatty acid radicals having at least 8 carbon atoms and not more than 32 carbon atoms each; and said ester prior to sulfur-conversion being free from any unreacted hydroxyl radical as part of the alcoholic residue.

5. A process for breaking petroleum emulsions of the water-in-oil type, characterized by subjecting the emulsion to the action of a demulsifier comprising a sub-rubbery polymeric sulfur-converted polyhydric alcohol ester; said ester prior to sulfur conversion containing at least 2 radicals derived from monoethylenic fatty acids having 18 carbon atoms each; and said ester prior to sulfur-conversion being free from any unreacted hydroxyl radical as part of the alcoholic residue.

6. A process for breaking petroleum emulsions of the water-in-oil type, characterized by subjecting the emulsion to the action of a demulsifier comprising a sub-rubbery polymeric sulfur-converted glycerol ester; said ester prior to sulfur-conversion containing 3 monoethylenic fatty acid radicals having 18 carbon atoms each; and said ester prior to sulfur-conversion being free from any unreacted hydroxyl radical as part of the alcoholic residue.

7. A process for breaking petroleum emulsions of the water-in-oil type, characterized by subjecting the emulsion to the action of a demulsifier comprising a sub-rubbery polymeric sulfur-converted tri-ricinolein.

GWYNNE ALLEN.